United States Patent
Seipp et al.

(10) Patent No.: US 10,960,507 B2
(45) Date of Patent: Mar. 30, 2021

(54) DUST EXTRACTION SHROUD FOR A POWER TOOL

(71) Applicant: Black & Decker Inc., New Britain, CT (US)

(72) Inventors: Jochen Seipp, Staufenberg (DE); Stefan Gensmann, Frucht (DE); Richard Cacchiotti, Middle River, MD (US)

(73) Assignee: Black & Decker Inc., New Britain, CT (US)

( * ) Notice: Subject to any disclaimer, the term of this patent is extended or adjusted under 35 U.S.C. 154(b) by 129 days.

(21) Appl. No.: 16/249,286

(22) Filed: Jan. 16, 2019

(65) Prior Publication Data

US 2019/0224797 A1    Jul. 25, 2019

(30) Foreign Application Priority Data

Jan. 19, 2018  (GB) ..................... 1800896

(51) Int. Cl.
  *B23Q 11/00* (2006.01)
  *B25F 5/02* (2006.01)
  *B23B 49/00* (2006.01)

(52) U.S. Cl.
  CPC ........ *B23Q 11/0046* (2013.01); *B23B 49/005* (2013.01); *B25F 5/02* (2013.01); *B23B 2270/62* (2013.01)

(58) Field of Classification Search
  CPC ......... B23B 27/10; B23B 47/34; B23B 51/06; E25D 17/14; B23Q 11/00; A47L 9/14; B08B 15/00

(Continued)

(56) References Cited

U.S. PATENT DOCUMENTS 4,097,176 A * 6/1978 Wanner ................ B23Q 1/0036
  175/213
8,342,782 B2 * 1/2013 Nishikawa ........... B23Q 11/006
  408/67

(Continued)

FOREIGN PATENT DOCUMENTS

DE   102016014210 A1   10/2017
EP       1457288 B1    11/2005

(Continued)

OTHER PUBLICATIONS

EP ESSR dated Jul. 19, 2019 in co-pending EP application 19152054.3.

*Primary Examiner* — Nathaniel C Chukwurah
(74) *Attorney, Agent, or Firm* — Amir Rohani

(57) ABSTRACT

A shroud for a dust extractor comprises: a body portion including a tubular housing forming a passageway and having a first and second inlets defining first and second openings; an engaging portion including a tubular housing forming a passageway, the tubular housing connecting to a third opening formed through a wall of the body portion to connect the passageway of the engaging portion with the passageway of the body portion on one end, and including a third inlet defining a fourth opening on another end; and a seal mounted in the second inlet of the body portion, the outer edge of the seal being attached to the periphery of the second inlet, the seal projecting radially inwardly towards the longitudinal axis of the tubular body.

23 Claims, 18 Drawing Sheets

(58) Field of Classification Search
USPC .................................................. 173/171, 198
See application file for complete search history.

(56) References Cited

U.S. PATENT DOCUMENTS

| | | | |
|---|---|---|---|
| 2002/0141836 A1* | 10/2002 | Ege | B23Q 11/0046 408/67 |
| 2004/0192184 A1* | 9/2004 | Staas | B23Q 11/0046 454/49 |
| 2006/0153650 A1 | 7/2006 | Simm et al. | |

FOREIGN PATENT DOCUMENTS

| | | |
|---|---|---|
| EP | 2474385 B1 | 6/2014 |
| EP | 3060371 B1 | 2/2019 |

* cited by examiner

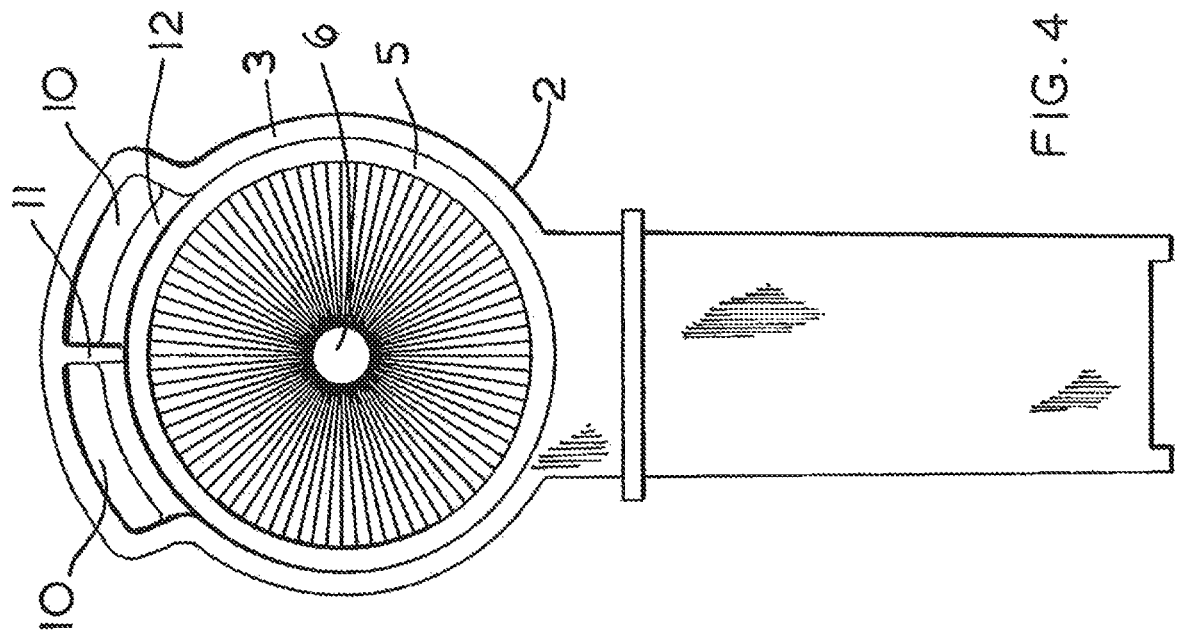
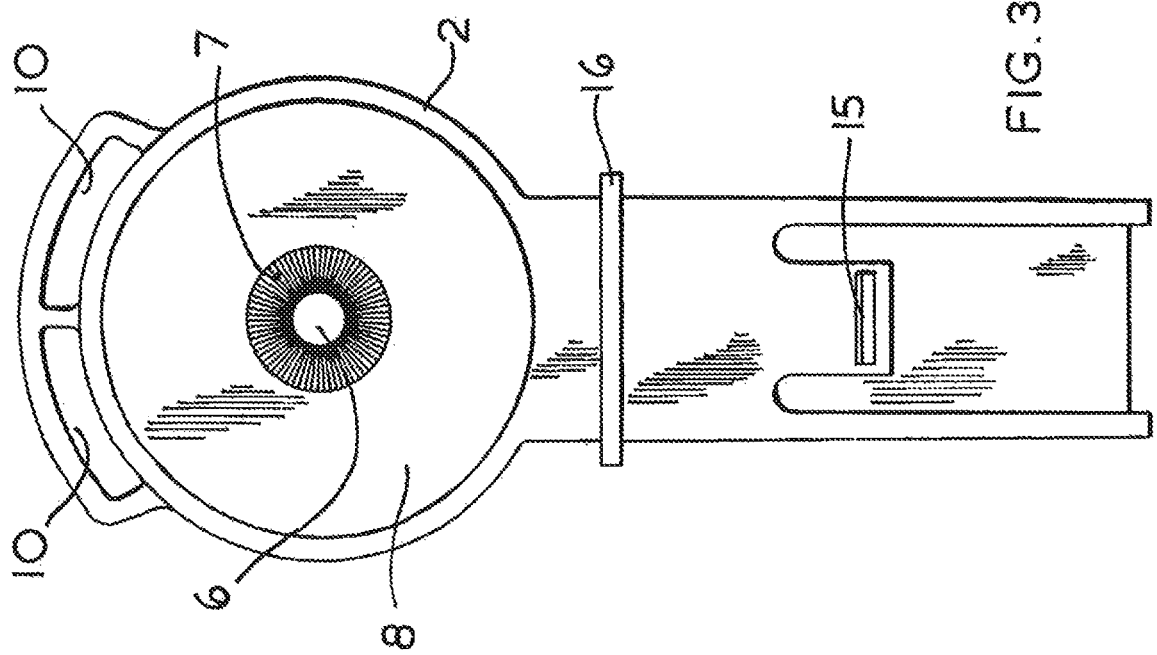

DUST EXTRACTION SHROUD FOR A POWER TOOL

CROSS-REFERENCE TO RELATED APPLICATIONS

This application claims priority, under 35 U.S.C. § 119, to UK Patent Application No. 18 008 96.1 filed Jan. 19, 2018.

FIELD

The present invention relates to a dust extraction shroud for use with a stop bit.

BACKGROUND

In many countries, legislation defining working conditions on building sites is becoming increasingly stringent. In particular, legislation governing levels of airborne dust encountered by users of power tools are becoming increasingly important.

Many types of building work involve drilling into and/or demolishing walls and concrete structures, with hand held tools such as drills and combined hammer drills. Such drilling work typically involves releasing large amounts of dust into the air, which can be hazardous if inhaled, particularly dust containing fine particulate matter such as quartz. For this reason, it is desirable to protect the tool user from inhaling the dust.

EP1457288 describes a dust extraction shroud or a portable power tool in which the drill bit passes through the shroud whilst it is held flush against the wall or structure being drilled. The shroud is connected to a source of suction which removes dust from the shroud as it is being produced.

FIG. 12 shows a stop bit. The stop bit comprises an elongate shank 100, having a longitudinal axis and a circular cross section, with a connecting end 102 and a cutting end 104. The cutting end 104 comprises a drill bit tip 106 formed on the end of the cutting end 104, which is used to penetrate a work piece. A series of helical ridges 108 extend around the shank away from the drill bit tip 106 which remove debris, generated by the cutting action of the drill bit tip 106, away from the drill bit tip 106. The connecting end 102 can be smooth so that it can be grip by the jaws of a chuck. Alternatively, it can comprise the grooves 112 of the SDS PLUS or SDS MAX connection system for use with an appropriate tool holder. A radial flange 110 is formed on the shank 100 between the connecting end 102 and the cutting end 104. The flange 110 has a diameter D1 which is substantially larger than the diameter of the shank D2 and extends in a direction which is perpendicular to a longitudinal axis of the shank 100. The flange 110 has a uniform thickness T1. The flange 110 is located at a pre-determined distance from the drill bit tip 106. The purpose of the flange 110 is to limit the amount the drill bit tip can penetrate the surface of a work piece. Once the drill it tip 106 has penetrated the surface of the work piece by the pre-determined distance, the side of the flange 110 engages with the surface and prevents the drill bit tip from penetrating any further

SUMMARY

According to an embodiment, a shroud for a dust extractor is provided comprising: a body portion including a tubular housing having a first inlet formed at one end defining a first opening and a second inlet formed at the other end defining a second opening, wherein the tubular housing forms a passageway which connects the first and second openings and has a longitudinal axis; an engaging portion including a tubular housing which connects at one end to a side of the body portion and which forms a passageway having a longitudinal axis extending the length of the tubular housing, wherein the tubular housing, at one end, connects to a third opening formed through a wall of the body portion to connect the passageway of the engaging portion with the passageway of the body portion, and, at the other end remote from the body portion, comprises a third inlet defining a fourth opening; and a seal mounted in the second inlet of the body portion, the outer edge of the seal being attached to the periphery of the second inlet, the seal projecting radially inwardly towards the longitudinal axis of the tubular body.

In an embodiment, at least a part of a wall which forms the third inlet of the engaging portion extends further away from the rest of the wall which forms the third inlet to form a top wall, the top wall being resiliently deformable in order to bend in a direction perpendicular to the longitudinal axis of the engaging portion and comprises a recess formed on one side of the top wall engageable with a ridge formed on a dust extractor, when the shroud is mounted on a dust extractor, to lock the shroud to the dust extractor.

In an embodiment, the radial length L1 the seal is less that the length L2 of the tubular body.

In an embodiment, the seal is mounted in the second inlet of the body portion in a freely rotatable manner.

In an embodiment, the passageway of the tubular housing of the body portion is circular in cross section, and wherein the inner radius of the passageway in cross section is greater than 20 mm.

BRIEF DESCRIPTION OF THE DRAWINGS

A prior art design of shroud and dust extractor is described below with reference to FIGS. 1 to 11. Preferred embodiments of the present invention is also described below, by way of example only and not in any limitative sense, with reference to the FIGS. 13 to 24.

FIG. 3 is a rear view of the shroud of FIG. 1;

FIG. 4 is a front view of the shroud of FIG. 1;

DETAILED DESCRIPTION

Figure 1:
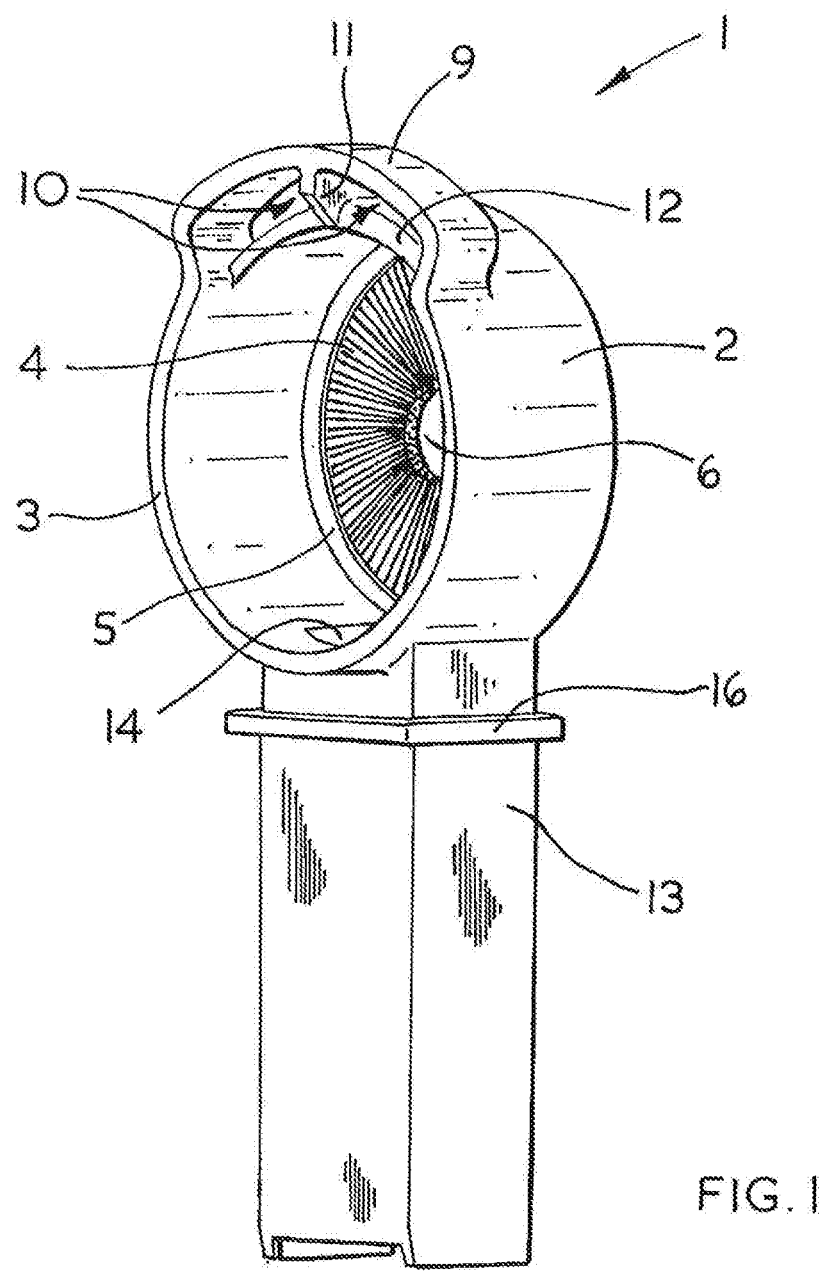
FIG. 1 is a perspective view from the front and one side of a prior art dust extraction shroud.

A prior art design of shroud and dust extractor will not be described with reference to FIGS. 1 to 11.

Referring to FIGS. 1 to 4, a dust extraction shroud 1 is formed from moulded plastic material and has a body portion 2 of substantially circular cross-section. The body portion 2 has a rim 3 adapted to be placed against a wall or other structure to be drilled. Rim 3 defines a first inlet and is substantially flat such that when placed against a wall there is little or no space between the wall and the edges of the inlet.

A circular brush 4 is disposed on the opposite side of body portion 2 to the rim 3, the bristles of brush 4 extending radially inwardly from a circular rim 5 and end at a point short of the central axis of body portion 2, such that a circular gap 6 defining a third inlet is left in the centre of the brush 4.

Figure 2:
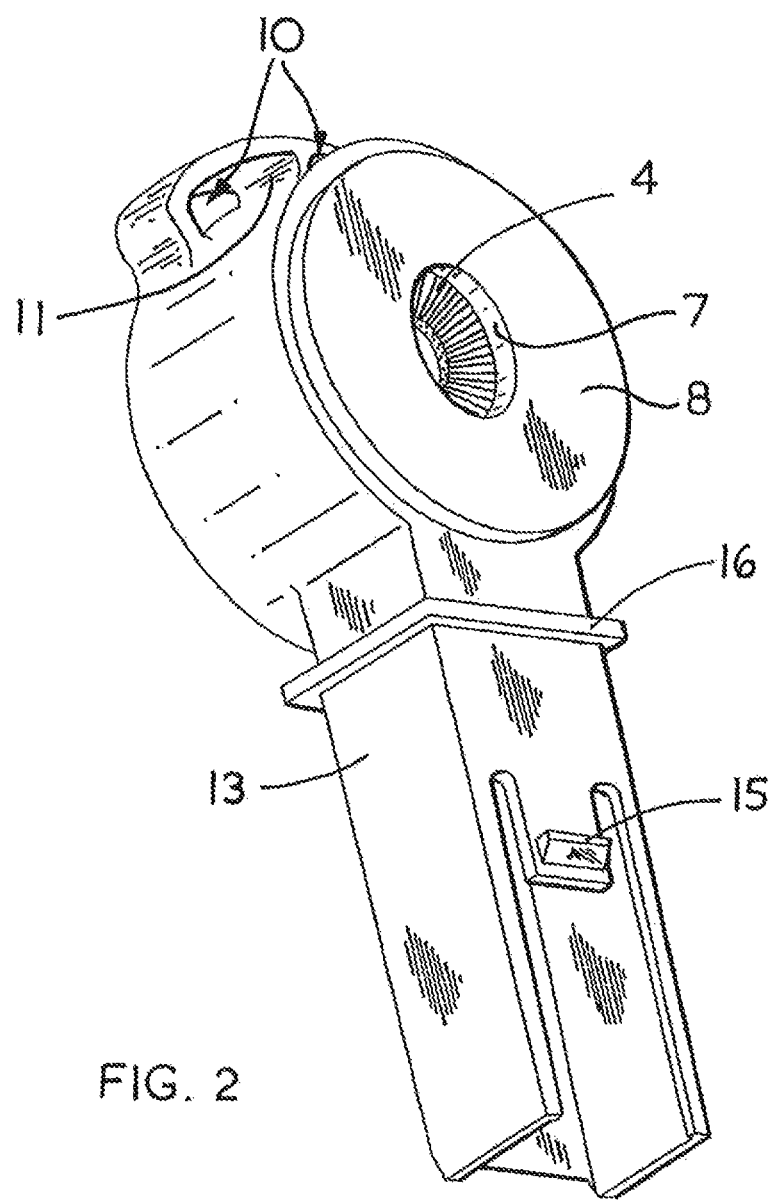
FIG. 2 is a rear perspective view from one side of the shroud of FIG. 1.

A circular aperture 7 is provided on rear face 8 of body portion 2, the aperture 7 being larger than the circular gap 6 in the brush 4. This feature is best shown in FIGS. 2 and 3. A drill bit (not shown) of a hammer drill, the drill bit having a substantially circular cross-section, can pass through aperture 7 and the circular gap 6 in the middle of brush 4 such that the drill bit (not shown) is able to come into contact with a wall or other surface engaged by rim 3. The brush 4 acts as a seal to firstly restrict the flow of air into body portion 2 via aperture 7, and secondly to restrict the flow of dust out of body portion 2 past the brush 4.

The body portion 2 also has a protruding collar 9 which extends outwardly from the upper surface of body portion 2. The collar 9 defines two rearwardly disposed inlets 10, separated by a supporting rib 11, between the collar 9 and the adjacent cylindrical part of body portion 2, the inlets 10 being on the side of collar 9 remote from rim 3. A shortened portion 12 of body portion 2 (this feature is best shown in FIG. 1) forms the inner surface of inlets 10. As a result of the fact that the shortened portion 12 does not extend as far forward as rim 3, the intake of air is permitted into body portion 2 through inlets 10 when the shroud 1 is pressed against a workpiece surface.

An engaging portion 13 of generally uniform rectangular cross-section extends downwardly from the bottom of body portion 2. An outlet 14 is formed in the bottom face of body portion 2 such that air is permitted to flow out of body portion 2 through hollow engaging portion 13.

Figure 5:
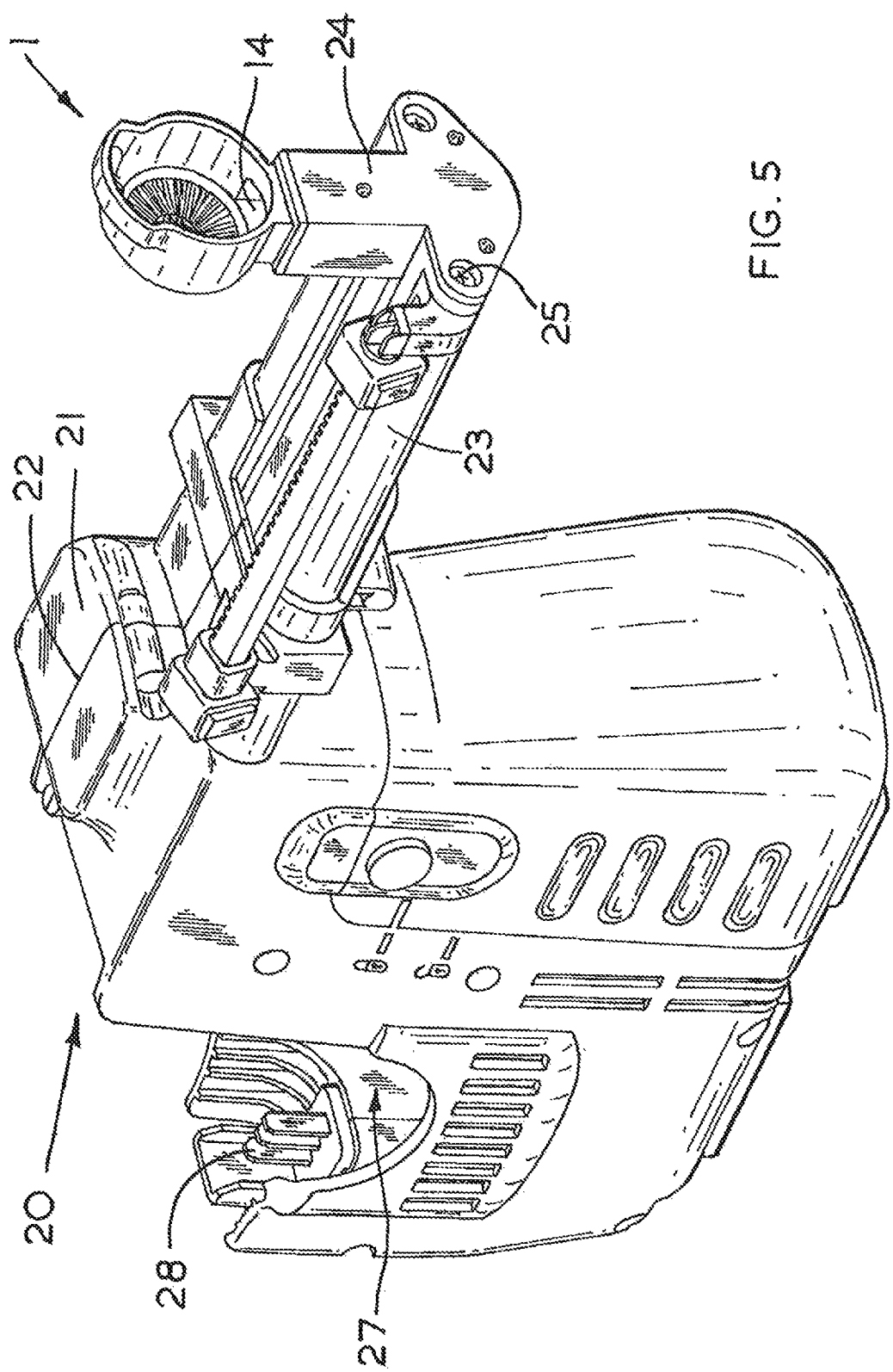
FIG. 5 is a front perspective view from one side of a dust extraction apparatus including the shroud of FIG. 1 with a telescopic arm thereof in an extended condition.

Referring to FIGS. 2 and 3, the engaging portion 13 has a generally uniform rectangular cross-section to enable the shroud 1 to be slid in and out of a corresponding rectangular receiving member 24 on a dust extraction apparatus (FIG. 5). A resilient clip 15 and a stop 16, which extends around the entire outer surface of engaging portion 13, combine to hold the shroud 1 rigidly in place in the corresponding receiving member 24. This feature will be described in more detail below.

Referring now to FIGS. 5 to 9, a dust extraction apparatus 20 incorporating the shroud 1 comprises a housing 21 of a durable plastics material formed from two clam shell halves and separated by centre line 22. This type of construction is well-known to persons skilled in the art and will not be described in further detail. The dust extraction apparatus 20 has a forwardly extending telescopic arm 23. The telescopic arm is shown fully extended in FIGS. 5,6 and 9, and is shown fully retracted into housing 21 in FIGS. 7 and 8.

Figure 6:
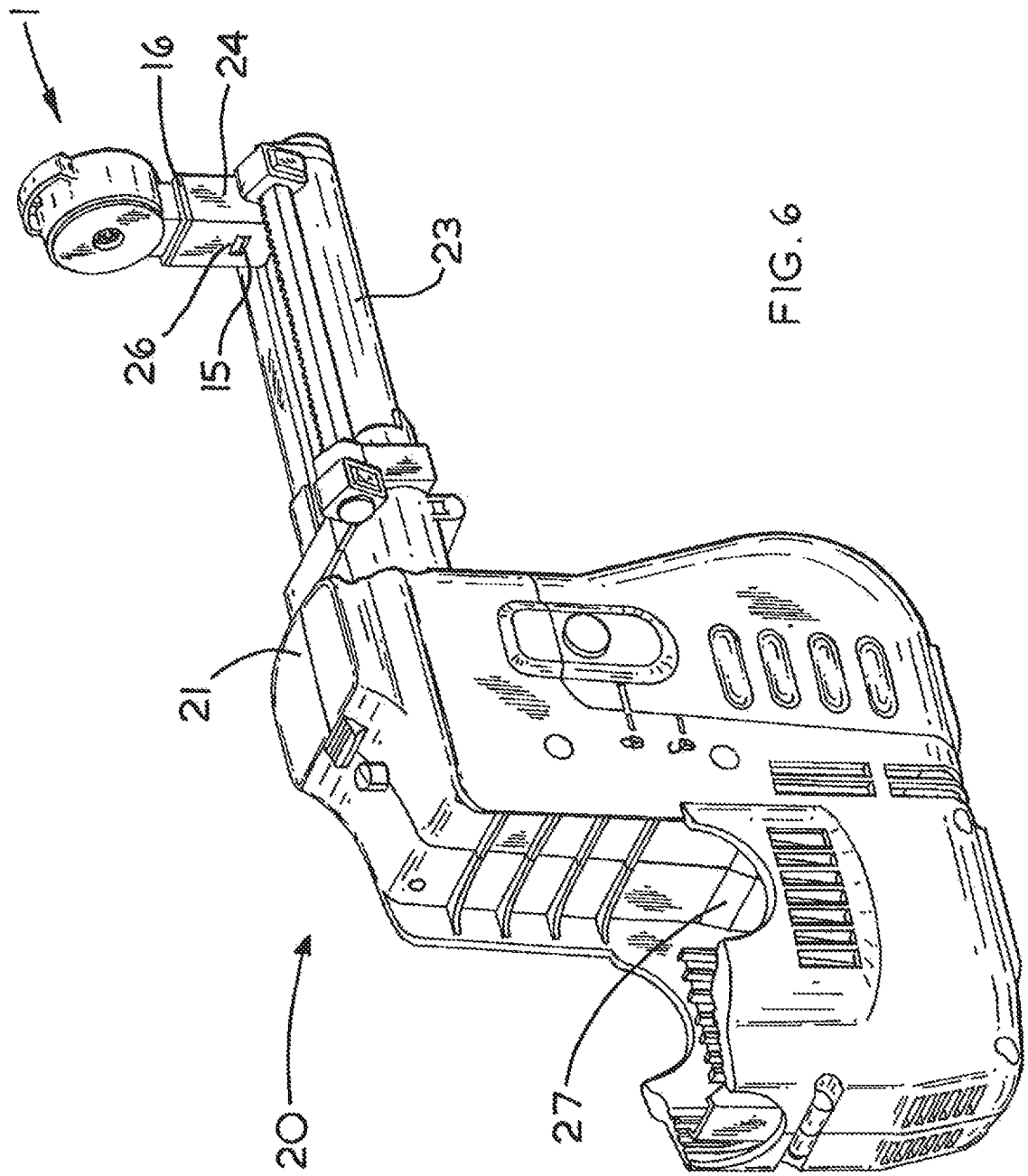
FIG. 6 is a rear perspective view from one side of the dust extraction apparatus of FIG. 5.

A receiving member 24 of generally rectangular cross-section is attached to the forward end of telescopic arm 23 by a pair of screws 25 and extends upwardly from telescopic arm 23. The engaging portion 13 (FIG. 1) of shroud 1 is formed so that it can be slidingly received in the receiving member 24. Referring specifically to FIG. 6, a rectangular aperture 26 is formed in the rear face of receiving member 24 such that resilient clip 15 of the engaging portion 13 (FIG. 2) engages aperture 26, and the stop 16 engages the upper surface of receiving member 24. In this way, it can be seen that the shroud 1 is held in place in receiving member 24 at the forward end of telescopic arm 23. In order to facilitate the release of the shroud 1, for example to replace the shroud 1 when brush 4 has worn out, a user would depress resilient clip 15 through aperture 26 allowing a user to slide the shroud 1 out of engagement with receiving member 24. It will also be appreciated by persons skilled in the art that the height of shroud 1 relative to telescopic arm 23 can be adjusted by sliding the engaging portion 13 in receiving member 24, for example to accommodate power tools (FIG. 10) of different dimensions.

The telescopic arm 23 is hollow and connected to receiving member 24. As a result of this, air is able to flow through shroud outlet 14, down through receiving member 24, through the telescopic arm 23 and into the interior of housing 21.

A fan (not shown) powered by an electric motor (not shown) disposed inside housing 21 sucks air into shroud outlet 14, and through telescopic arm 23. The air is then passed through a filter, for example a cylindrical filter, such that dust particles contained in air passing through the filter are retained inside the filter element, and the filtered air is then expelled from an outlet (not shown). This type of filter mechanism is well known to persons skilled in the art and will therefore not be described in greater detail.

Figure 7:
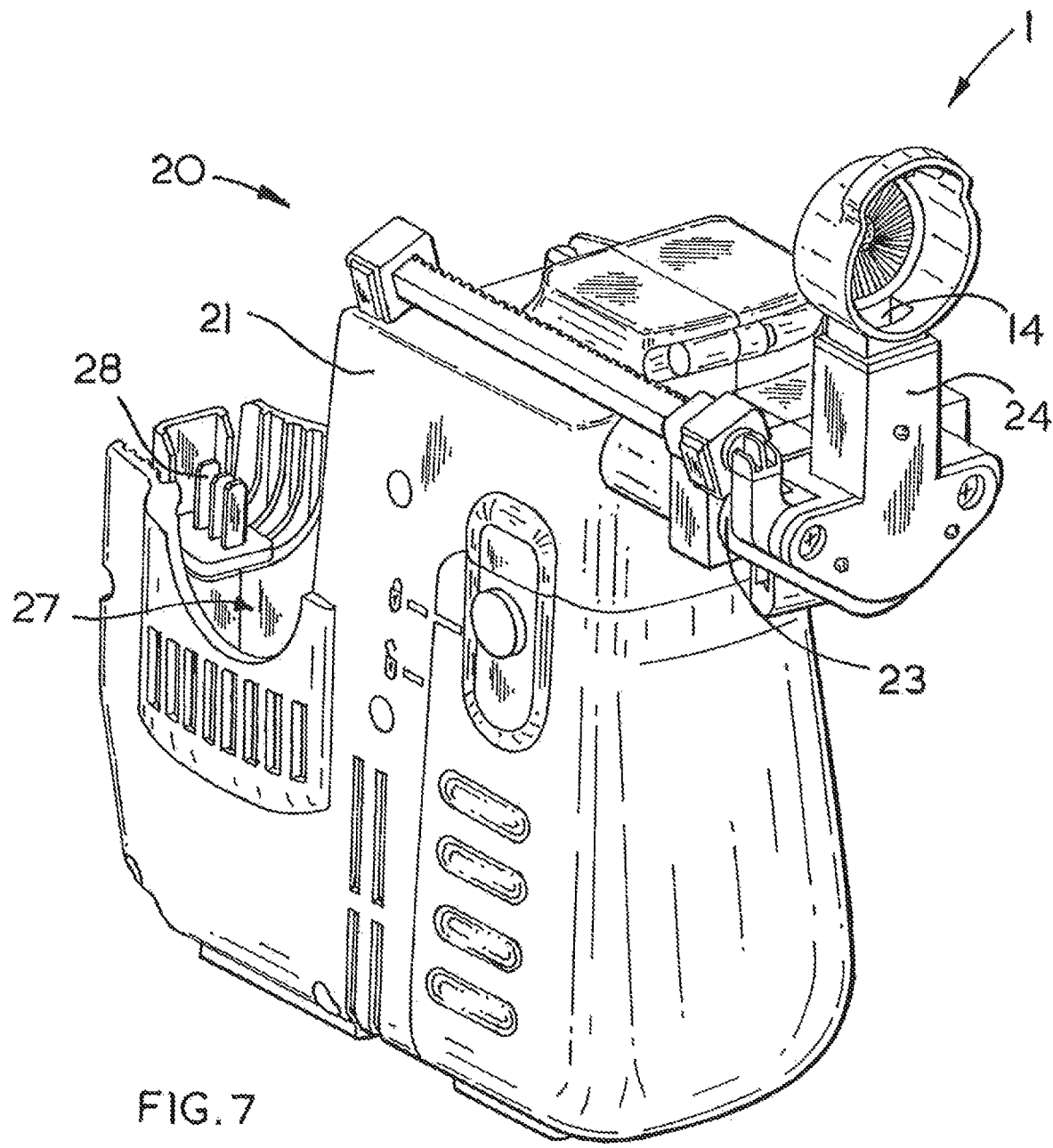
FIG. 7 is a front perspective view corresponding to FIG. 5 of the dust extraction apparatus of FIG. 5 in which the telescopic arm has been fully compressed into the housing of the apparatus.
Figure 8:
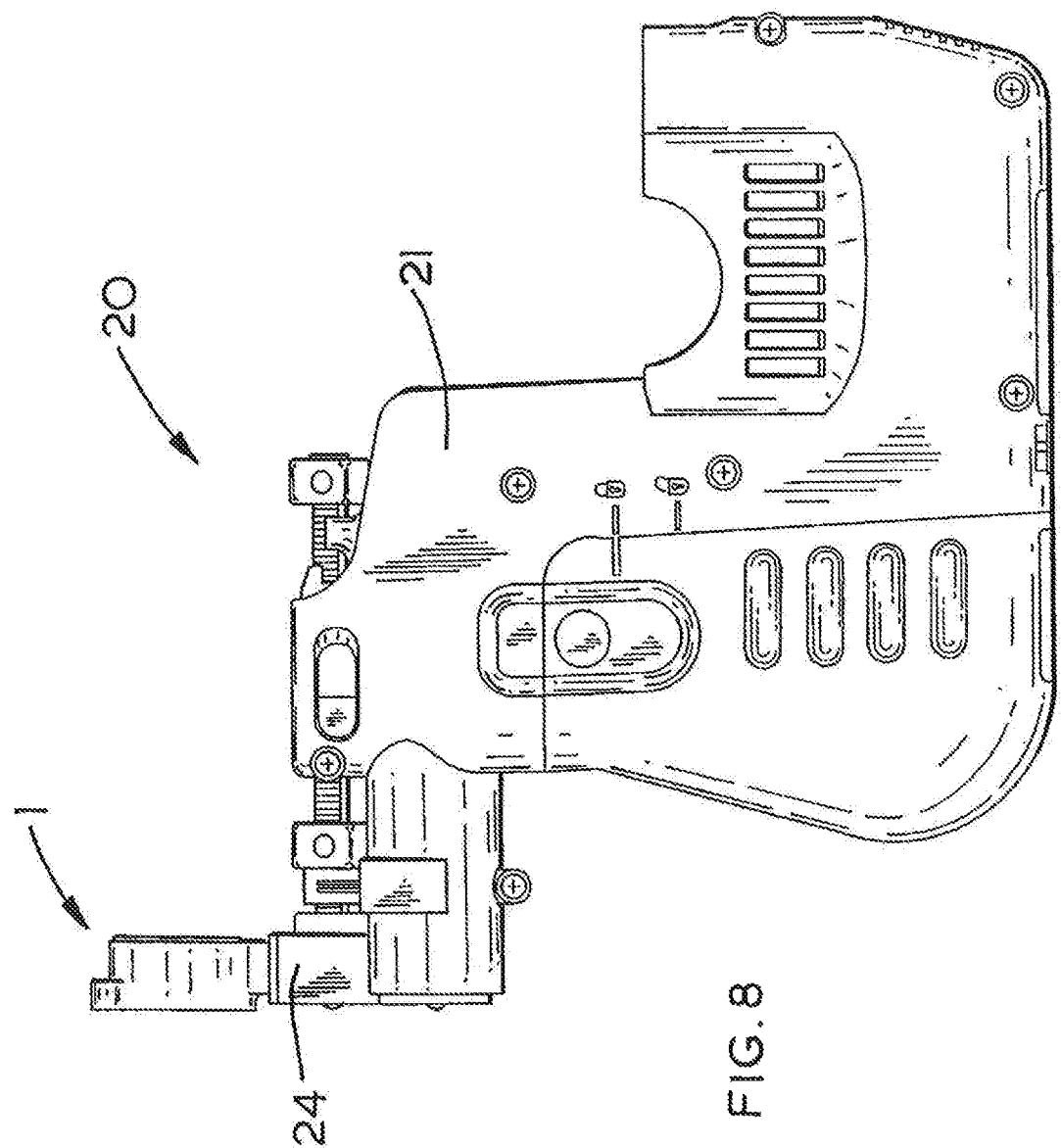
FIG. 8 is a side view of the apparatus of FIG. 7.
Figure 9:
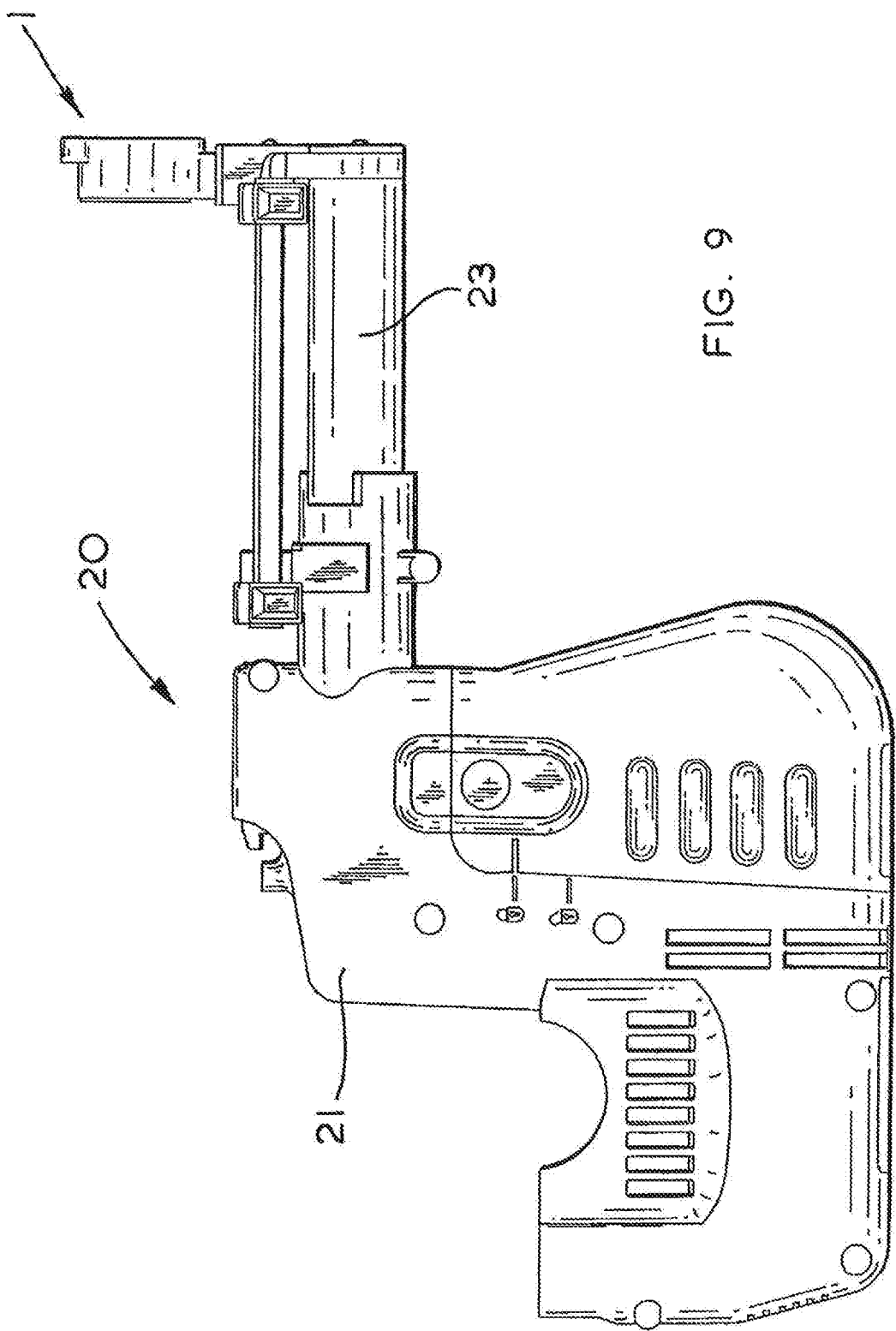
FIG. 9 is a side view of the apparatus of FIG. 5.
Figure 10:
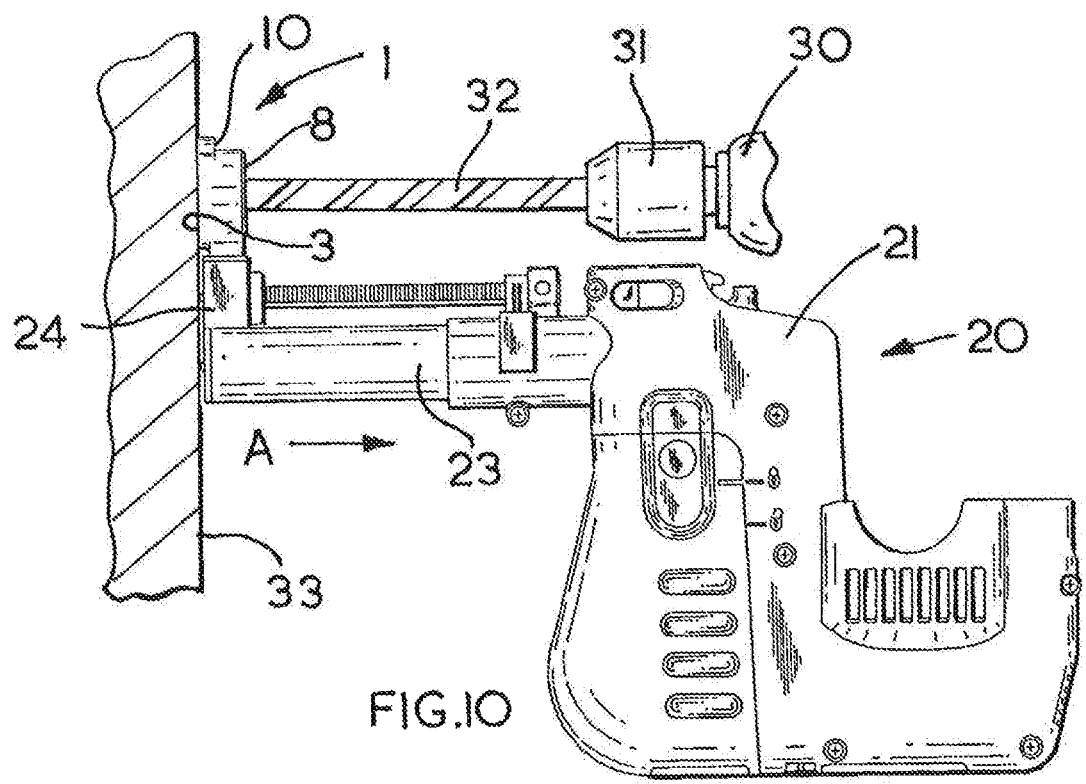
FIG. 10 is a side view of the apparatus of FIG. 9 and part of a power drill mounted thereto.

The dust extraction apparatus 20 further comprises a recessed rear portion 27. Referring to FIGS. 5 and 7, three terminal blades 28 are adapted to be received in corresponding female terminals (not shown) of a power tool such as a hammer drill (FIG. 10). The power tool is adapted to slot into recess 27 and lock into place such that the drill or hammer bit of the tool lies parallel to the telescopic arm 23 and passes through aperture 7 and brush 4 into shroud 1.

The power supply of the power tool is then used to provide electrical power for the suction apparatus of dust extraction apparatus 20. In this way, the dust extraction apparatus 20 does not have to carry its own power supply and is therefore less heavy and bulky.

Figure 11:
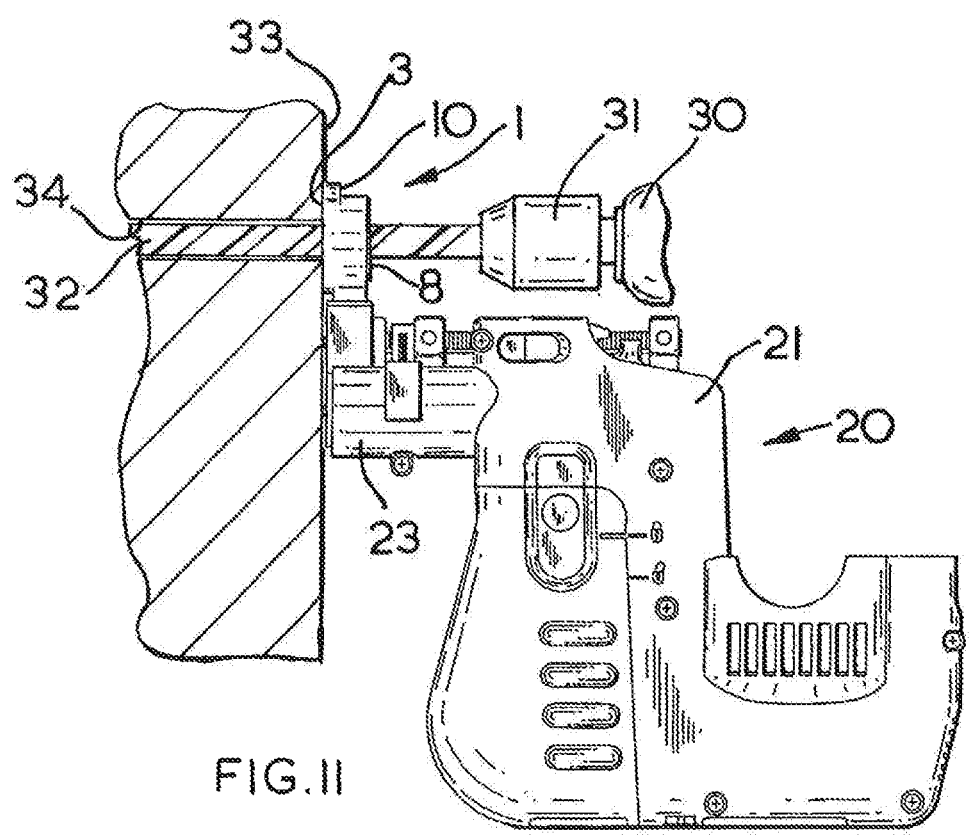
FIG. 11 is a side view corresponding to FIG. 10 of the apparatus of FIG. 8 and part of the power drill mounted thereto.

Referring now to FIGS. 10 and 11, the operation of the dust extractor when combined with a power drill will now be described.

A power drill 30 mounted to and providing power for the dust extraction apparatus 20 of FIGS. 5 to 9, includes a chuck 31 and a drill bit 32. The drill bit 32 passes into the back of shroud 1 via aperture 7 (FIG. 2) and through brush 4 (FIG. 2) such that the ends of the bristles of brush 4 contact the drill bit 32 and form a partial seal around the drill bit 32. In FIG. 10, the drill bit 32 extends forwardly so as to just contact the surface of wall 33. The shroud 1 is also in contact with wall 33 such that the 3 is held flush against the wall 33.

In the operation of the drill, as the user applies pressure and the drill bit 32 is driven into the wall 33, this causes telescopic arm 23 to retreat into the extractor housing 21. As a result of this the shroud 1 remains in contact with wall 33, whilst the drill bit 32 is permitted to penetrate wall 33. Dust produced by the action of the drill bit 32 is therefore prevented from leaving the interior of shroud 1, other than via outlet 14.

At the same time, the dust extractor 20 is in operation drawing air into inlets 10, across drill bit 32, down through receiving member 24, through telescopic arm 23 and into the interior of housing 21. In this way, the dust produced by the drill bit is removed from the immediate vicinity of drill bit 32, and filtered out of the airstream by a filter (not shown) disposed inside housing 21 such that air expelled from the dust extractor outlets (not shown) is clean.

When the required hole 34 has been drilled into wall 33, the drill is deactivated. The dust extraction apparatus 20 is provided with a timer (not shown) that continues to operate the dust extractor for a predetermined time, for example 30 seconds, after the drill has been deactivated. As the drill bit 32 is pulled out of wall 33, the telescopic arm 23 is spring-loaded such that it advances along drill bit 32 and remains in contact with wall 33. As a result of this, any dust produced after deactivation of the drill and removal of the drill bit from the wall is also removed.

Figure 12:
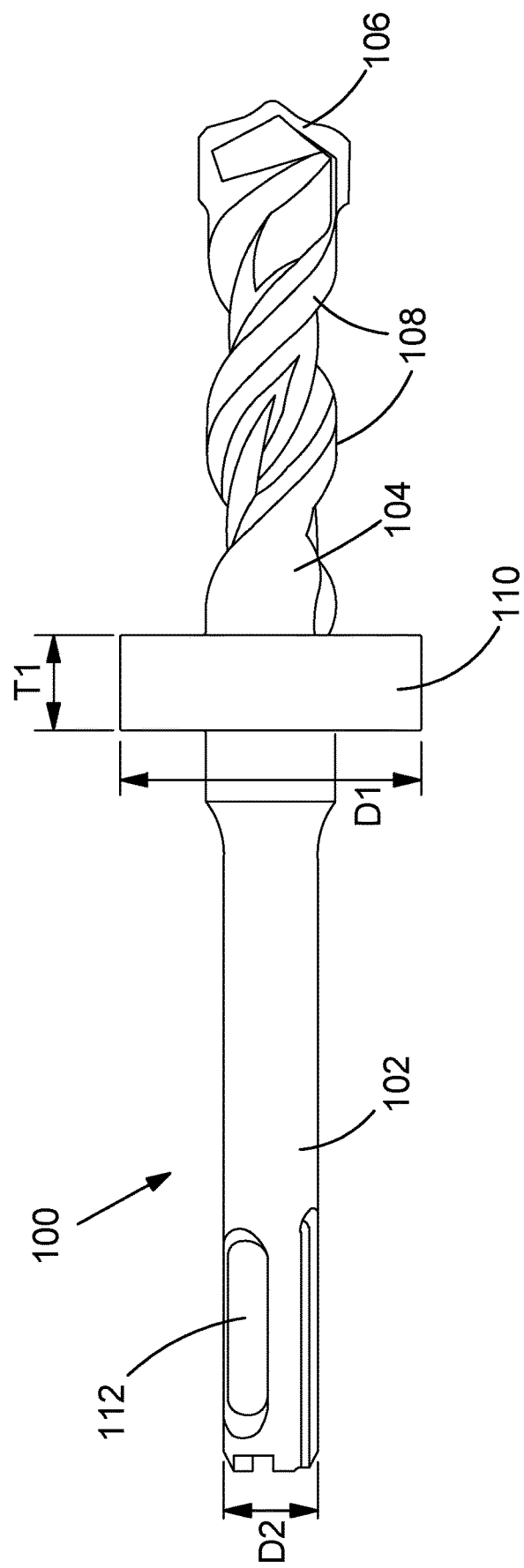
FIG. 12 shows a stop bit.
Figure 13:
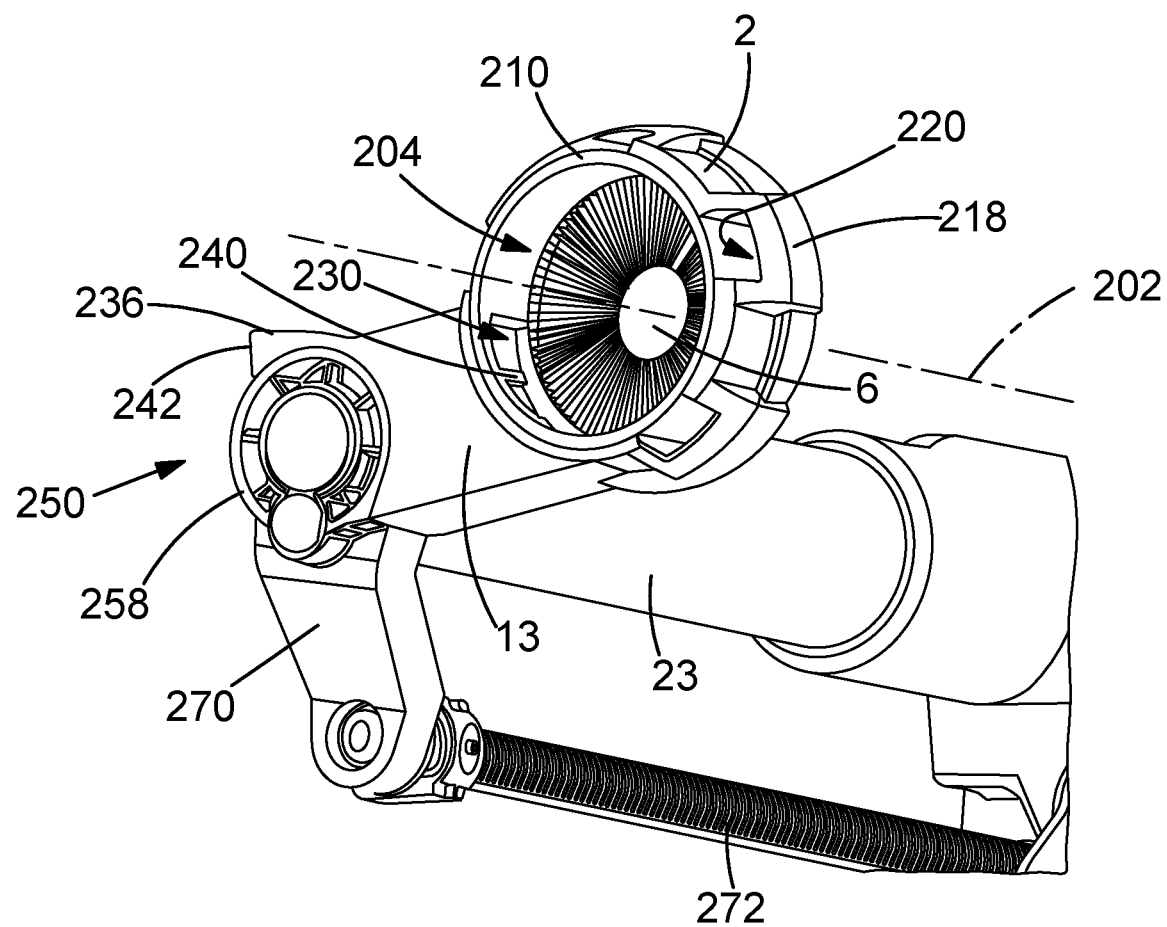
FIG. 13 shows a front perspective view of the shroud mounted on a stop of a dust extractor in accordance with an embodiment of the present invention.
Figure 14:
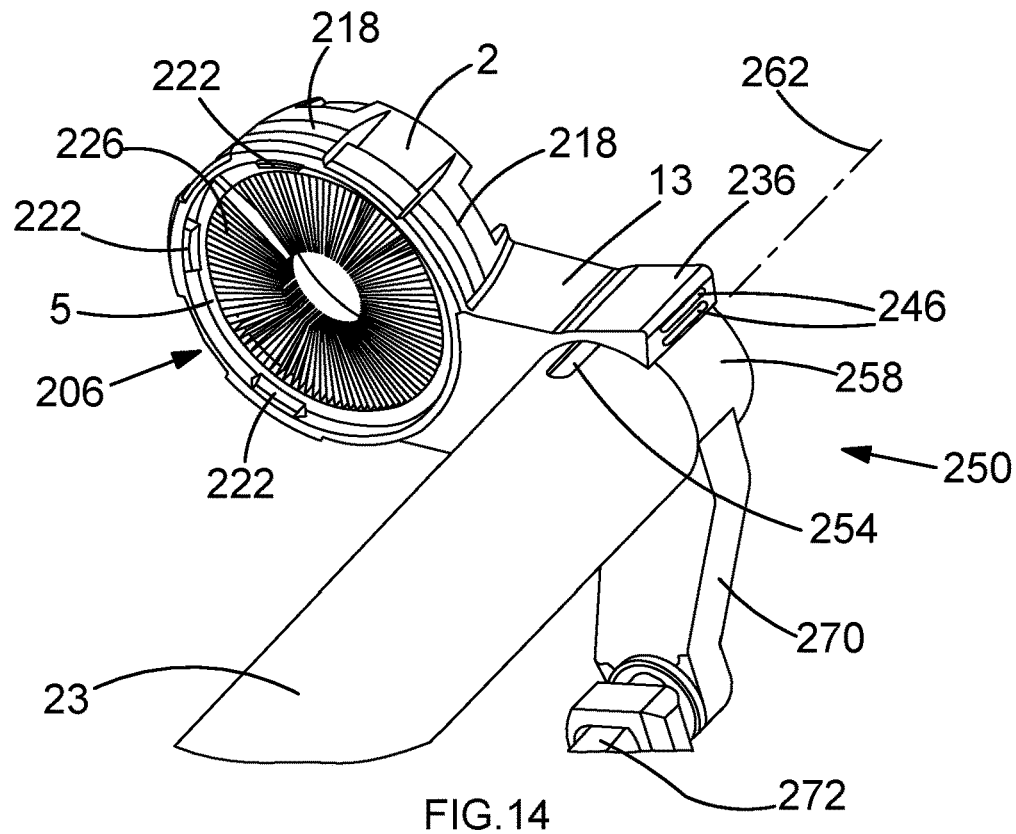
FIG. 14 shows a rear perspective view of the shroud mounted on the stop in FIG. 13.
Figure 15:
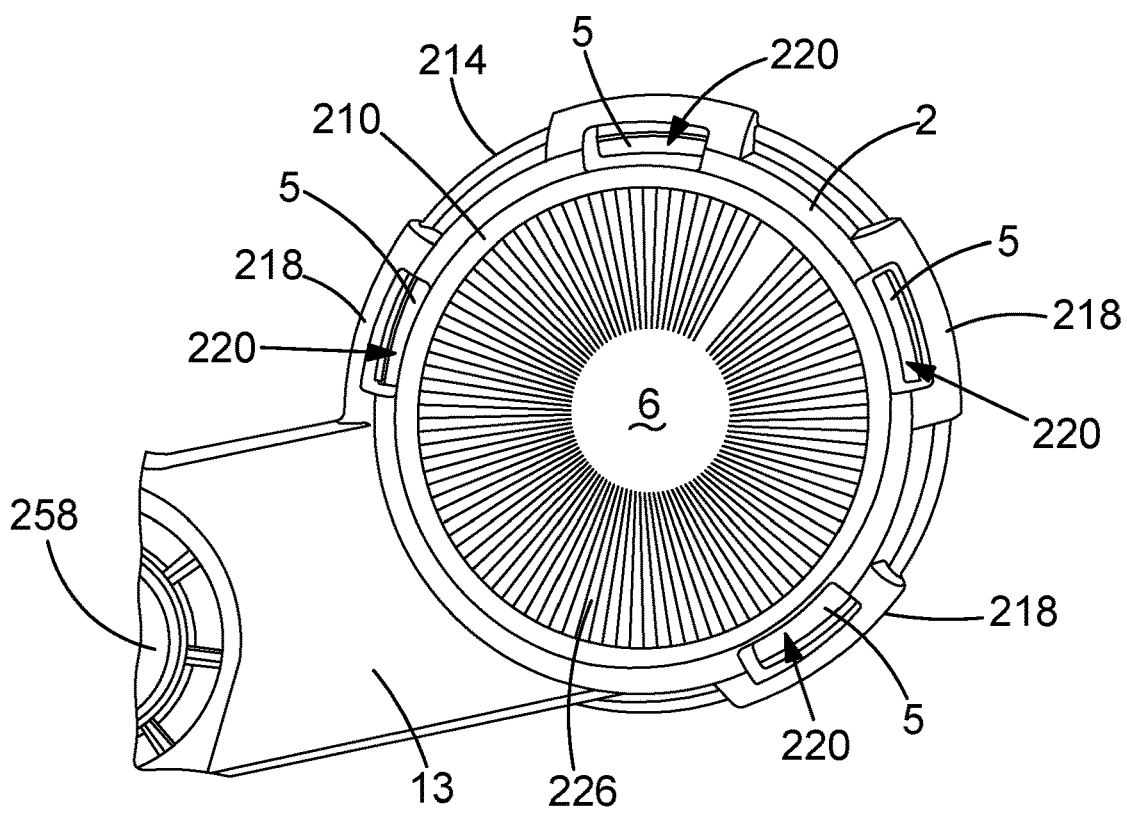
FIG. 15 shows a front view of the shroud.
Figure 16:
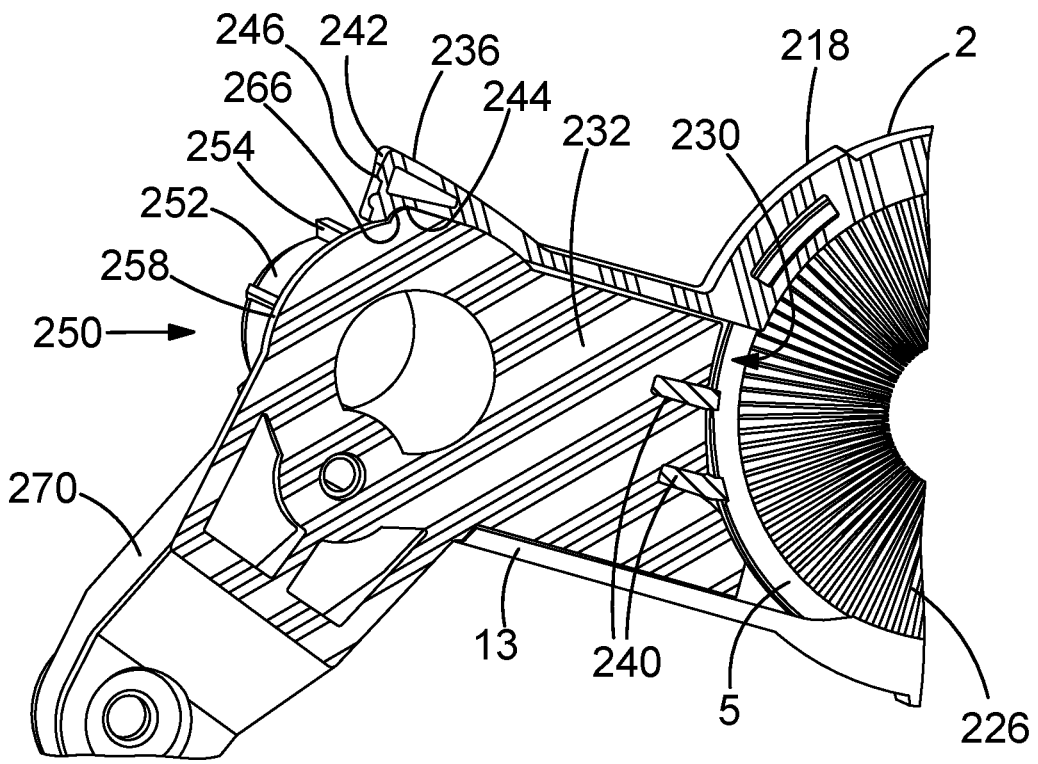
FIG. 16 shows a cross sectional view of the shroud mounted on the stop (without the telescopic arm or depth stop of the dust extractor)
Figure 17:
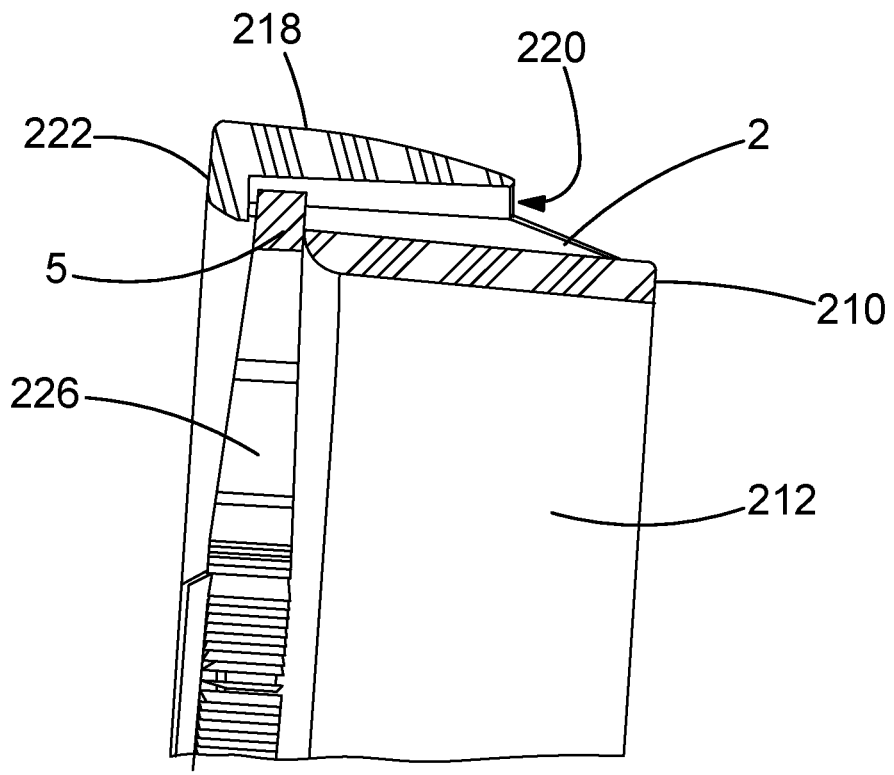
FIG. 17 shows a cross sectional view of the top part of the seal mounted within the body portion of the shroud.
Figure 18:
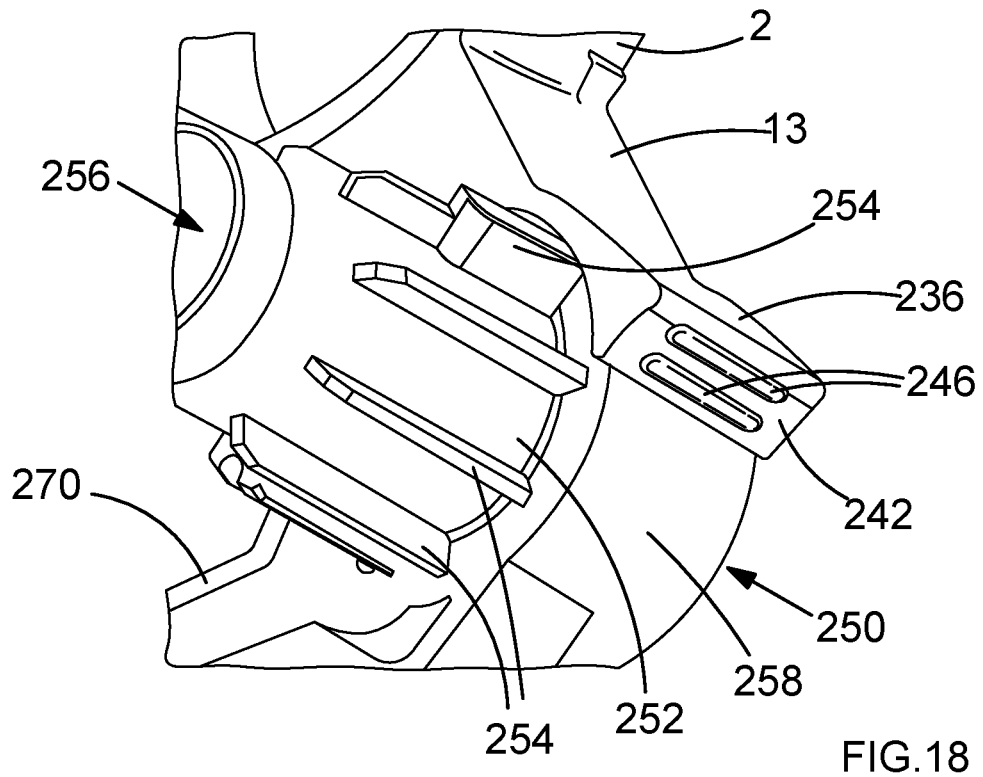
FIG. 18 shows the stop (without the telescopic tube of the dust extractor) with the shroud latched onto the end piece.
Figure 19:
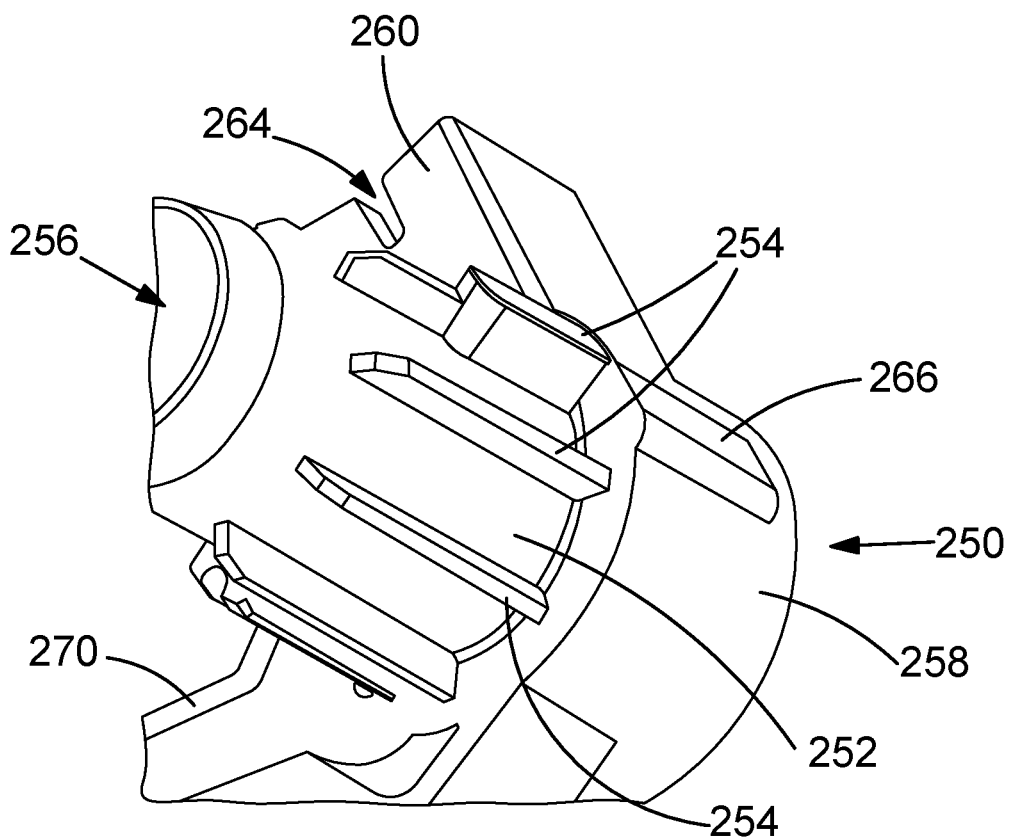
FIG. 19 shows the stop (without the telescopic tube of the dust extractor) without the shroud latched onto the end piece.
Figure 20:
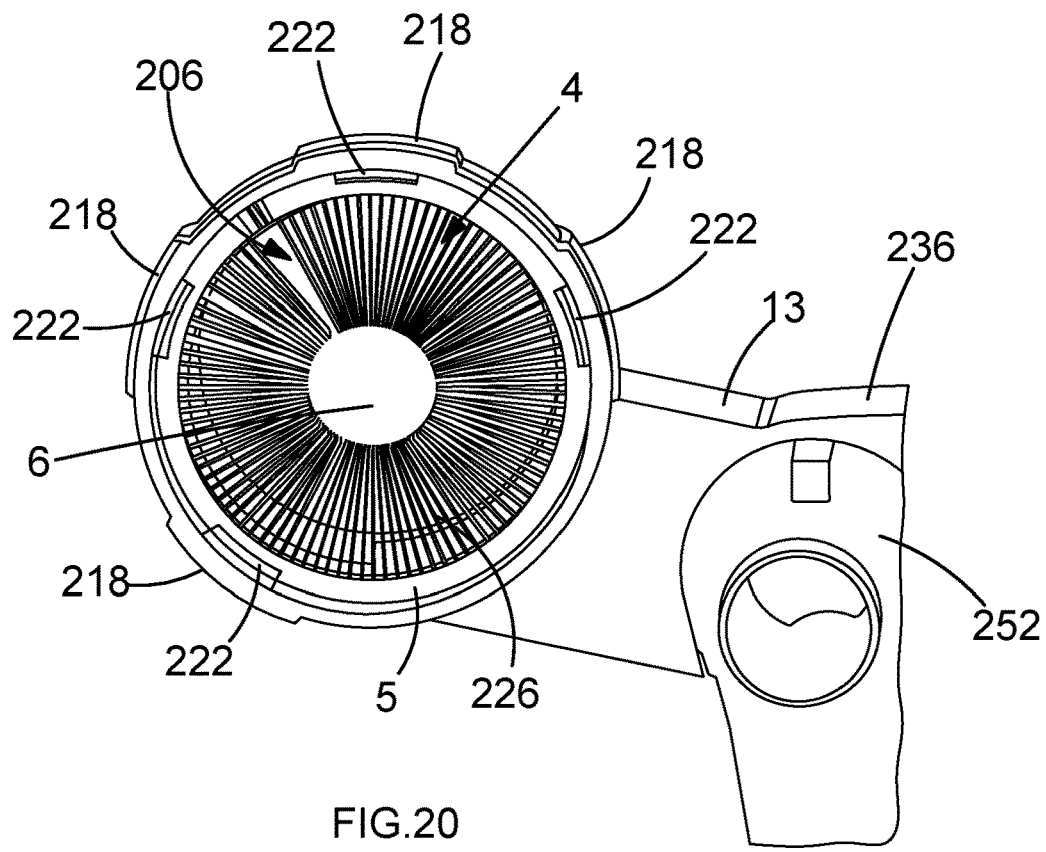
FIG. 20 shows a rear view of the shroud mounted on the stop (without the telescopic arm or depth stop of the dust extractor.
Figure 21:
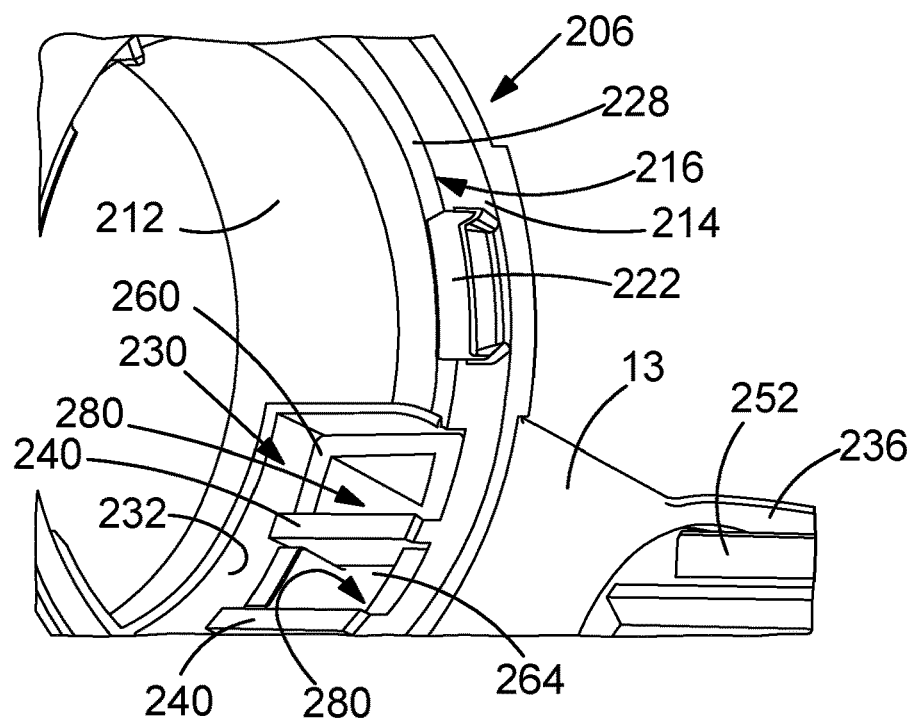
FIG. 21 shows an inside view of the body portion of the shroud without the seal when mounted on the stop.

An embodiment of the present invention will now be described with reference to FIGS. 13 to 23. Where the same features are used in the embodiment which are used in the prior art shroud and dust extractor as described with reference to FIGS. 1 to 11 or the stop bot described with reference to FIG. 12, the same reference numbers have been used. The invention relates to a new design of shroud and new attachment mechanism for the shroud to a dust extractor.

Figure 22:
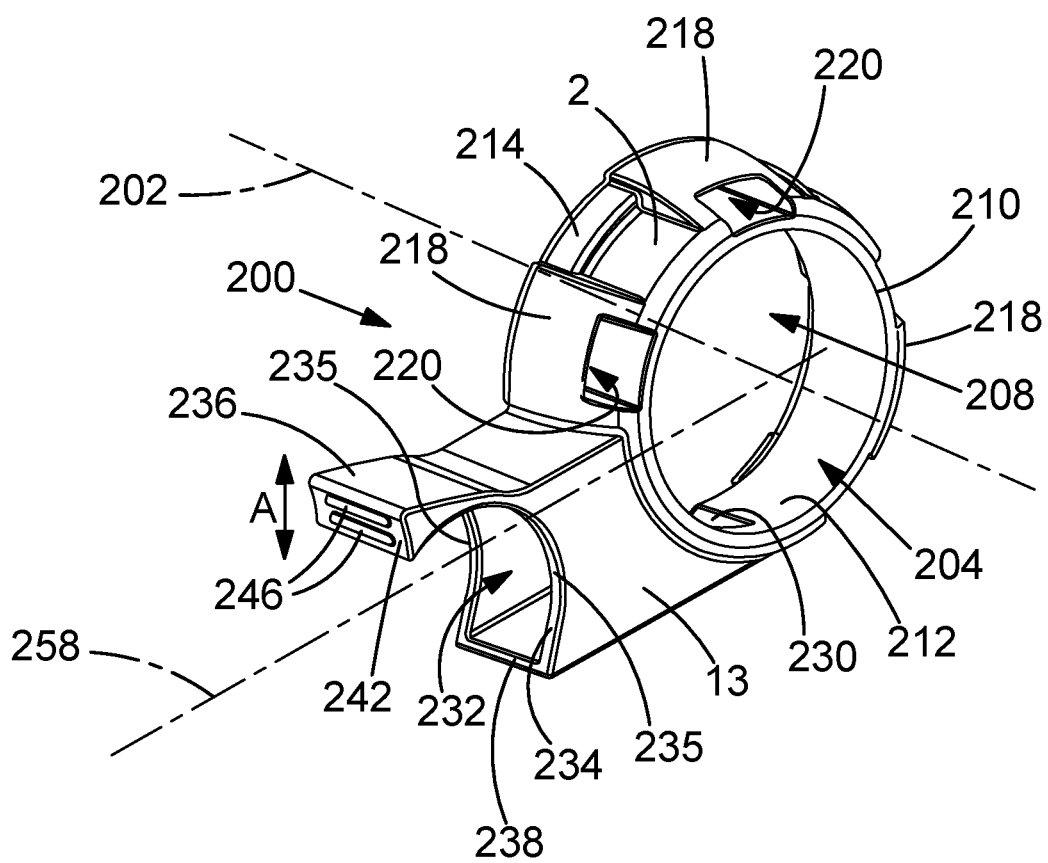
FIG. 22 shows the plastic clam shell of the shroud.

The shroud comprises a main housing 200 (FIG. 22 shows the main housing 200 only of the shroud) which is manufactured from plastic and is formed as a one-piece construction. The main housing 200 has a body portion 2 which is formed as a tubular housing 210, 214 which is tubular in shape with a longitudinal axis 202 and of circular cross section. The body portion 2 is connected to an engaging portion 13 which connects to the telescopic arm 23 of a dust collector. The body portion 2 has two circular openings which are centred on the longitudinal axis 202 at either end of the body 3, a first opening 204 formed by a first inlet at the front of the body portion and a second opening 206 formed by a second inlet at the rear of the body portion 3. The openings 204, 206 are aligned with each other and connect to each other via a passageway 208 of circular cross section formed between the two openings in the direction of the longitudinal axis 202. The planes of the two openings 204, 206 are parallel to each other, the planes being perpendicular to the longitudinal axis 202.

The body portion 2 comprises a central core section 210, the inner surface of which forms the wall 212 of the passageway 208, the inner surface being located symmetrically about the longitudinal axis 202. Radius of inner surface of core from axis is 20.173 mm. Formed around the rear end of the central core section 210 is a rim 214. The rim 214 extends rearwardly of the core to form a ledge 216 located between the end 228 of the core 214 and the inner surface if the rim 214. The rim 214 surrounds the second opening 206.

Formed around the outer surface of the body portion 2 are four raised portions 218 which extend from the front of the body portion 2 to rear. Each raised portion 218 comprises a rectangular passage 220. The rectangular passage 220 is formed during the manufacturing process of the shroud when the plastic material in the central region of the raised portion is pushed rearwardly to form hooks 222 which project inwardly from the inner surface of the rim 214.

A seal 4 is mounted inside the second opening 206. The seal 4 comprises a circular metal ring 5 attached to which are bristles 226 which extend radially inwardly to form a circular gap 6. The outer diameter of the metal ring 5 is slightly less than that of the inner diameter of the rim 214 but greater than the inner diameter of the core 210. When the seal 4 is mounted on the body portion 2, the circular metal ring 5 is located on the ledge 216 and held in place against the end 228 of the core 214 by the hooks 222. The centres of the metal ring 5 and the gap 6 locate on the longitudinal axis 202 of the body 200. The diameter of the hole in bristles is 15 mm diameter. The hooks 222 hold the seal in such a manner that the seal 4 can freely rotate around the longitudinal axis whilst being held within the ledge by the hooks 222. The length of the bristles may be longer, equal to or shorter than the length of the body portion 2.

The engaging portion 13 has a tubular housing which is tubular in shape having a rectangular cross section to form four walls and which is attached to the side of the body portion 2 and projects in a direction along its longitudinal axis 298 which is perpendicular to the longitudinal axis 202 of the body portion 2. The engaging portion 13 forms a passageway 232 which extends through the length of the engaging portion 13. The body portion 2 comprises a third opening 230 which formed through a side wall of the body portion 2. One end of the passageway 232 connects with the third opening 230 allowing air to pass between the passageway 208 of the body portion 2 and the passageway 232 of the engaging portion 13. Ribs 240 are formed across the third opening 230.

The end 234 of the engaging portion 13 remote from the body portion comprises a fourth opening formed by a third inlet which is defined by the edge of the walls of the engaging portion 13. Two opposite edges 235 are curved in a symmetrical manner. The top wall 236 above and between the two curved side walls extends further away from the body portion 2 than the bottom wall 238. The top wall 236 is resiliently deformable and can flex in the direction of Arrow A. On the lower side of the top wall 236, located in close proximity to the end 242 is a recess 244. Formed on the end of top wall 236 is a finger engagement zone which comprises two rubber grips 246. A user is able to flex the top wall 236 to move it relative to the rest of the engaging portion 13 in the direction of Arrow A be placing a finger on the end 242 of the top wall 236 to frictionally engage with the grips 246 and then move the end of the top wall in an up and down direction.

Mounted on the end of the telescopic arm 23 of a dust extractor is a stop 250. The dust extractor can be any type of dust extractor which can be mounted on a drill and which has a telescopic arm through which air and dust are sucked from a shroud into the dust extractor. A type of dust extractor has been described previously with reference to FIGS. 1 to 11. Whilst the present invention can be used with this design of dust extractor, the invention should not be limited to this specific design and can be used on a wide range of designs.

The stop has a tubular plug 252 which forms a passageway 256 and which comprises a series of external ribs 254. The tubular plug 252 is inserted into the end of the telescopic arm 23 with the passageway 256 mating with a passageway (not shown) inside of the telescopic arm 23. The ribs 254 engage with corresponding recesses (not shown) formed in the end of the telescopic arm 23 to secure the stop to the telescopic arm.

The stop 252 further comprises an end piece 258 which is attached to the end of the plug 252 and a insertion tube 260 connected to the side of the end piece 258. The insertion tube 260 is tubular in shape having a rectangular cross section and which projects in a direction which is perpendicular to a longitudinal axis 262 of the telescopic arm 23. The insertion tube 260 forms a passageway 280 which extends through the length of the insertion tube 260. The passageway 280 of the insertion tube 260 connects to the passageway 256 of the plug 252 via a passageway (not shown) formed through the end piece 258. The outer dimensions of the insertion tube 260 are slightly less than those of the inner surface of the passageway 232 of the engaging portion 13 so that the insertion tube 260 can be inserted into the passageway 232 of the engaging portion 13. Slots 264 are formed in the end of the insertion tube 260 remote from the end piece 258.

Formed on the top of the end piece 258 is a locking ridge 266 which extends in a direction parallel to the longitudinal axis 262 of the telescopic arm 23.

An arm 270 extends from the end piece 258 is a direction perpendicular to both the direction of the longitudinal axis of the telescopic tube and the direction the insertion tube 260. The arm 270 is used to support the end of a depth stop 272 of the dust extractor which connects to the end of the arm 270.

In order to attach the shroud 200 to the stop 250, the insertion tube 260 is inserted into the passageway 232 of the engaging portion 13 until the end 242 of the top wall 236 engages with the locking ridge 266. As the insertion tube 260 continues to be inserted into the passageway 232 of the engaging portion 13, the top wall 236 bends to allow the end 242 to ride over the locking ridge 266. Once the insertion tube 260 is fully inserted into the passageway 232 of the engaging portion 13, the recess 244 on the underside of the top wall 236 aligns with the locking ridge 266 of the end piece 258, allowing the top wall 236 to return to its original shape due to its resilient nature, the locking ridge 266 entering recess 244 as it does so. The locking ridge 266 is held in engagement in the recess by the resilient nature of the top wall 236. When the insertion tube 260 is fully inserted into the passageway 232 of the engaging portion 13, ribs 240 of the shroud 200 locate within the slots 264 formed in the end of the insertion tube 260. When the insertion tube 260 is fully inserted into the passageway 232 of the engaging portion 13, the two opposite curved side walls and bottom wall 238 abut against the end piece. When the insertion tube 260 is fully inserted into the passageway 232 of the engaging portion 13, the top wall wraps around the end piece 258.

The engagement of the locking ridge 266 and the recess 244 locks the shroud to the stop 252, the shroud's relative orientation and position being maintained by the co-operation the insertion tube 260 and the passageway 232 in the engaging portion 13 due to their relative size and shape which prevents any rotational movement between them. When the locking ridge 266 is held in engagement in the recess 244 by the resilient nature of the top wall 236, the insertion tube 260 is locked to the engaging portion 13 and is prevented from any axial movement within the engaging portion 13. The engagement of the locking ridge 266 with the recess 244, together with the ribs 240 and their engagement with the slots 264, ensure that the insertion tube 260 is securely locked to the engagement portion 13 and is prevented from making any axial movement.

In order to remove the insertion tube 260 from the engaging portion 13, a user needs to flex the top wall 236 to move it relative to locking ridge 266 to disengage the locking ridge 266 from the recess 244. The user achieves this by placing a finger on the end 242 of the top wall 236 to frictionally engage with the grips 246 and then move the end 242 of the top wall 236 in an upward direction so that the locking ridge 266 becomes disengaged from the recess 244. Once the locking ridge 266 is disengaged from the recess, the insertion tube can be slid out of the engaging portion 13.

In order to use the shroud with a stop bit, a stop bit is placed in and held by a tool holder of a hammer drill. The shroud is attached to the stop 252 of a dust extractor in the manner described above. The dust extractor is then attached to the hammer drill. The hammer drill and dust extractor are activated. Then the body portion 2 of the shroud is placed against the surface 290 of a work piece to be drilled with the front rim surrounding the opening 204 engaging the surface 290. The operator pushes the hammer drill towards the surface 290 moving the tip 106 of the stop bit through the seal 4 and then through the passageway 208 of the body portion 2 until engages with the surface of the work piece. As the hammer drill moves forward, the length of the telescopic arm 23 reduces to allow for the relative movement between the shroud and the hammer drill. The operator continues to move the hammer drill forward as the tip 106 of the stop bit penetrates the work piece. As the tip 106 penetrates the work piece, the flange 110 of the stop bit also passes through the seal 4 and then through the passageway 208 of the body portion 2 until the side of the flange 110 engages with the surface 290 of the work piece. Once the side of the flange 110 engages with the surface 290, the stop bit is prevented from penetrating the surface 290 any further. As such, the hammer drill can switched off and the tip 106 of the stop bit removed from the work piece. As the stop bit is penetrating the work piece, and dust or debris is collected inside of the passageway 208 of the body portion 2 and is then sucked through passageway 232 of the engaging portion 13 by the dust extractor. The seal 4 prevents any dust or debris exiting the passageway 208 through the rear opening 206 of the body portion 2.

Figure 23:
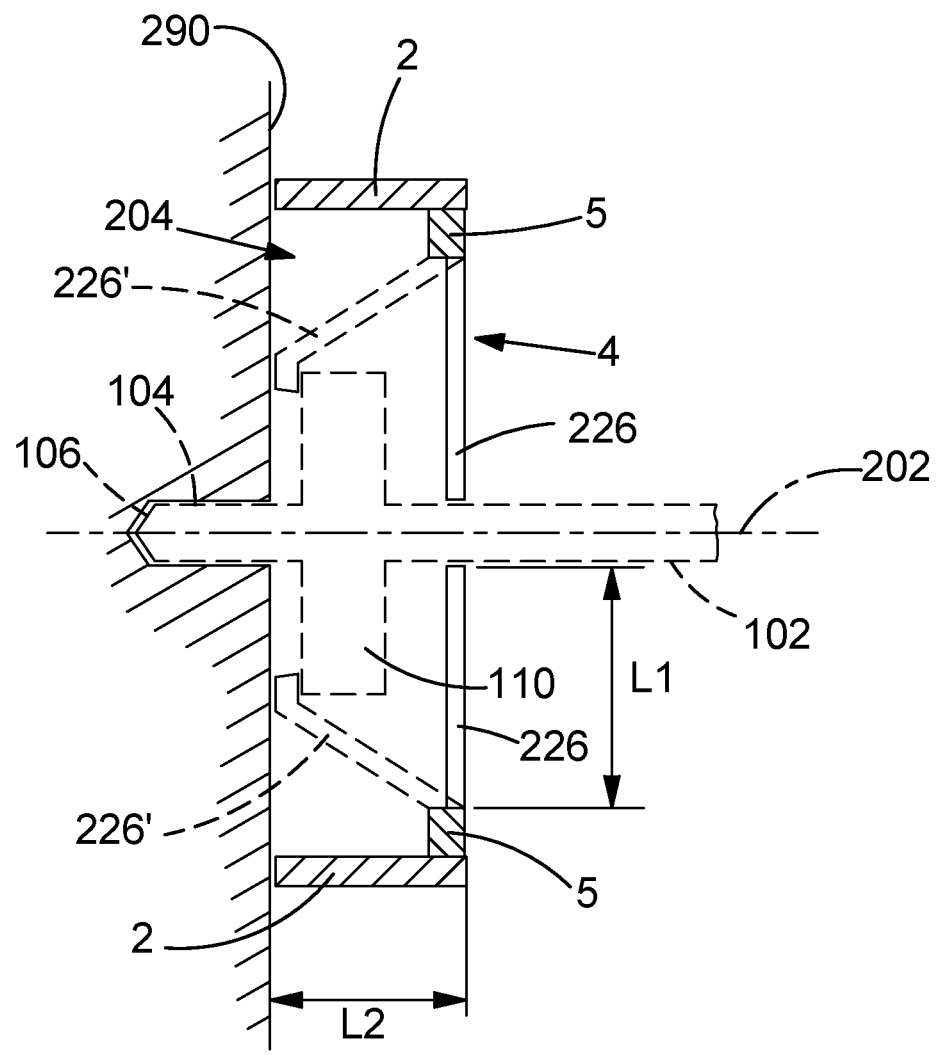
FIG. 23 shows a schematic diagram of the body portion of the shroud with a stop bit penetrating it.

If the radial length of the seal 4 (which is the length of the bristles 226), indicated by Arrow L1 in FIG. 23, is longer than the length of the tubular housing 210, 214 of the body portion 2, the ends of the bristles 226 of the seal may become trapped between the surface of the work piece and the side wall of the flange 110 of the stop bit (as shown in FIG. 23). Whilst trapped the stop bit may continue to rotate. However, as the seal 4 is mounted in a freely rotatable manner, a rotational force applied to the seal 4 by the rotating stop bit will not damage the seal as it is able to rotate with the stop bit.

Figure 24:
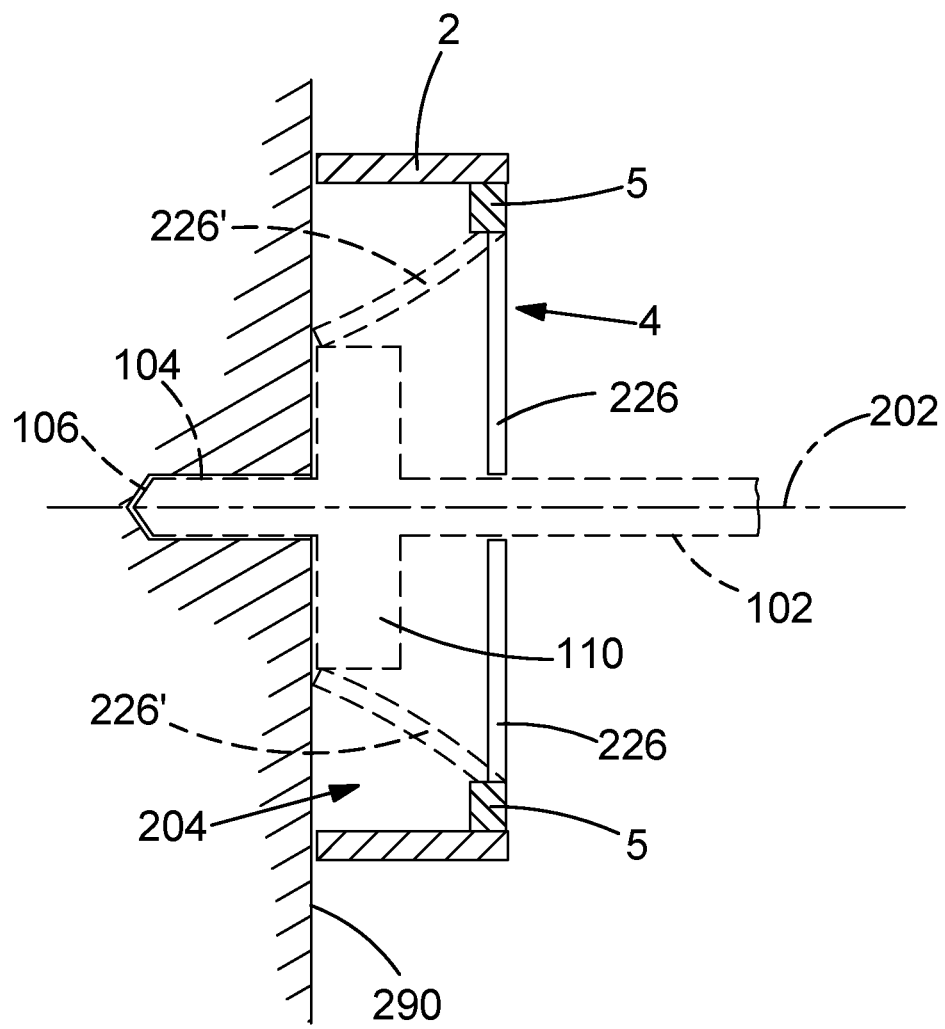
FIG. 24 shows a schematic diagram +of the body portion of the shroud with a stop bit penetrating it according to another embodiment of the present invention.

One way of ensuring that the ends of the bristles 226 of the seal do not become trapped between the surface of the work piece and the side wall of the flange 110 of the stop bit is to make the radial length L1 the seal (4) less than that of the length L2 of the tubular housing 210, 214 of the body portion 2 as shown in FIG. 24. As such the ends of the bristles 226 will merely rub along to outer edge of the flange 110 or locate behind it.

It will be appreciated that, as an alternative, the hooks 222 could be made to hold the seal 4 in such a manner that the seal 4 is either prevented from rotating around the longitudinal axis whilst being held within the ledge by the hooks 222 or only rotates when a certain level of force is applied, for example, due to friction, or only rotates over a limited range of angular movement. This may be desirable if the radial length L1 the seal (4) less than that of the length L2 of the body portion 2.

It will be further appreciated that other types of seal can be used instead bristles. The seal could be rubber ring for example.

It will be appreciated by persons skilled in the art that the above embodiment have been described by way of example only and not in any limitative sense, and that various alterations and modifications are possible without departure from the scope of the invention as defined by the appended claims.

Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

The invention claimed is:

1. A shroud for a dust extractor comprising:
   a body portion including a tubular housing having a first inlet formed at one end defining a first opening and a second inlet formed at the other end defining a second opening, wherein the tubular housing forms a passageway which connects the first and second openings and has a longitudinal axis;
   an engaging portion including a tubular housing which connects at one end to a side of the body portion and which forms a passageway having a longitudinal axis extending the length of the tubular housing, wherein the tubular housing, at one end, connects to a third opening formed through a wall of the body portion to connect the passageway of the engaging portion with the passageway of the body portion, and, at the other end remote from the body portion, comprises a third inlet defining a fourth opening; and
   a seal mounted in the second inlet of the body portion, the outer edge of the seal being attached to the periphery of the second inlet, the seal projecting radially inwardly towards the longitudinal axis of the tubular body,
   wherein at least a part of a wall which forms the third inlet of the engaging portion extends further away from the rest of the wall which forms the third inlet to form a top wall, the top wall being resiliently deformable in order to bend in a direction perpendicular to the longitudinal axis of the engaging portion and comprises a recess formed on one side of the top wall engageable with a ridge formed on a dust extractor, when the shroud is mounted on a dust extractor, to lock the shroud to the dust extractor;
   the shroud further comprising a finger engagement zone on an end of the top wall; and at least one rubber grip formed on the finger engagement zone.

2. The shroud of claim 1, wherein the recess is formed on the side of the top wall which faces the longitudinal axis of the engaging portion.

3. The shroud of claim 1, wherein the recess is formed in close proximity to an end of the top wall.

4. The shroud of claim 1, wherein the longitudinal axis of the body portion extends perpendicularly to the longitudinal axis of the engaging portion.

5. The shroud of claim 1, wherein the tubular housing of the engaging portion is rectangular in cross section to form four walls.

6. The shroud of claim 5, wherein edges of two opposite side walls of the four walls which form two sides of the third inlet are curved in a symmetrical manner.

7. The shroud of claim 6, wherein one of the four walls is extended to form the top wall.

8. The shroud of claim 7, wherein the wall which is extended to form the top wall is located between the two sides of the third inlet which are curved in a symmetrical manner.

9. The shroud of claim 1, wherein the radial length L1 of the seal is less that the length L2 of the tubular housing.

10. The shroud of claim 1, wherein the seal is mounted in the second inlet of the body portion in a freely rotatable manner.

11. The shroud of claim 1, wherein the passageway of the tubular housing of the body portion is circular in cross section.

12. The shroud of claim 11, wherein the inner radius of the passageway in cross section is greater than 20 mm.

13. A shroud for a dust extractor comprising:
   a body portion including a tubular housing having a first inlet formed at one end defining a first opening and a second inlet formed at the other end defining a second opening, wherein the tubular housing forms a passageway which connects the first and second openings and has a longitudinal axis;

an engaging portion including a tubular housing which connects at one end to a side of the body portion and which forms a passageway having a longitudinal axis extending the length of the tubular housing, wherein the tubular housing, at one end, connects to a third opening formed through a wall of the body portion to connect the passageway of the engaging portion with the passageway of the body portion, and at the other end remote from the body portion, comprises a third inlet defining a fourth opening; and a seal mounted in the second inlet of the body portion, the outer edge of the seal being attached to the periphery of the second inlet, the seal projecting radially inwardly towards the longitudinal axis of the tubular body;

wherein the seal is mounted in the second inlet of the body portion in a freely rotatable manner.

14. The shroud of claim 13, wherein at least a part of a wall which forms the third inlet of the engaging portion extends further away from the rest of the wall which forms the third inlet to form a top wall, the top wall being resiliently deformable in order to bend in a direction perpendicular to the longitudinal axis of the engaging portion and comprises a recess formed on one side of the top wall engageable with a ridge formed on a dust extractor, when the shroud is mounted on a dust extractor, to lock the shroud to the dust extractor.

15. The shroud of claim 13, wherein the longitudinal axis of the body portion extends perpendicularly to the longitudinal axis of the engaging portion.

16. The shroud of claim 13, wherein the tubular housing of the engaging portion is rectangular in cross section to form four walls.

17. The shroud of claim 13, wherein the inner radius of the passageway in cross section is greater than 20 mm.

18. A dust extraction apparatus comprising:
a main body;
a telescopic arm attached to and extending away from the main body;
a stop attached to the end of the telescopic arm remote from the body; and
a shroud according to claim 1 mounted on the stop;
wherein the stop comprises an insertion tube and an end piece, the insertion tube being attached to the end piece, the end piece comprising a ridge;
wherein, when the shroud is mounted on the stop, the insertion tube is inserted through the third inlet and into the passageway of the engaging portion until the third inlet abuts against the end piece and the ridge engages with the recess.

19. The dust extractor of claim 18, wherein the top wall flexes as the insertion tube is inserted into the passage of the engaging portion to enable the end of the top wall to pass over the ridge prior to the ridge aligning with and engaging the recess.

20. The dust extractor of claim 18, wherein the resilient nature of the top wall holds the ridge in engagement with the recess.

21. The dust extractor of claim 18, wherein, when the shroud is mounted on the stop, the top wall wraps around the end piece.

22. The dust extractor of claim 18, wherein the tubular housing of the engaging portion is rectangular in cross section to form four walls;
wherein the edges of two opposite side walls which form two sides of the third inlet are curved in a symmetrical manner; and
wherein, when the shroud is mounted on the stop, the two opposite curved side walls abut against the end piece.

23. The dust extractor of claim 18, wherein when the shroud is mounted on the stop, the bottom wall abuts against the end piece.

* * * * *